FREQUENCY TRANSLATED LASER ACOUSTIC DELAY LINE

Filed March 28, 1968

INVENTORS
ANTHONY J. DeMARIA
MICHAEL J. BRIENZA
BY Donald F. Bradley
ATTORNEY

United States Patent Office 3,492,495

Patented Jan. 27, 1970

3,492,495

FREQUENCY TRANSLATED LASER ACOUSTIC DELAY LINE

Anthony J. Demaria, West Hartford, and Michael J. Brienza, Vernon, Conn., assignors to United Aircraft Corporation, East Hartford, Conn., a corporation of Delaware Filed Mar. 28, 1968, Ser. No. 716,748
Int. Cl. H03h 9/30; H02m 5/04
U.S. Cl. 307—88.3 6 Claims

ABSTRACT OF THE DISCLOSURE

The output from a laser is mode-locked and passed through an acoustic cell in which a radio frequency acoustic wave has been generated. The laser beam is diffracted, and one of the frequency shifted diffracted modes is heterodyned at a detector with an unshifted mode to produce a time delayed radio frequency output signal lower in frequency than the input signal.

BACKGROUND OF THE INVENTION

This invention relates to delay lines, and in particular to a laser acoustic delay line in which a radio frequency input signal generates an acoustic wave in an acoustic cell. A laser beam intersects the acoustic wave at the Bragg angle thereby producing both a frequency shifted diffracted component and an undiffracted component of the laser beam. Both the diffracted and the undiffracted components are heterodyned and impinge on a detector which produces an output signal identical to the input signal but time delayed as a function of the distance in the acoustic cell between the generation of the acoustic wave and its intersection with the laser beam.

Laser acoustic delay lines are well known in the art. Copending patent application Ser. No. 551,965 filed May 23, 1966, and entitled "Variable Acoustic Laser Delay Line" describes and claims such a delay line.

It has been found that the utility of the laser acoustic delay line is limited by the response frequency of presently available photodetectors, since the photodetector must respond at the beat fequency between the shifted and unshifted components of the lase beam. For example, if a 2 gHz. radio frequency input signal is to be successfully recovered by optical heterodyning techniques, the photodetector must be capable of responding to light fluctuations at this operating frequency. While certain detectors are available with capabilities above 1 gHz., they are usually expensive, noisy and difficult to fabricate.

SUMMARY OF THE INVENTION

This invention avoids the difficulties of the prior art and permits operation of a laser acoustic delay line at very high frequencies by lowering the frequency at which the photodetector must respond. Specifically, the laser is mode-locked so that all of the axial modes of the laser oscillate in phase, and one of the frequency shifted diffracted modes is heterodyned with an undiffracted mode which is adjacent in frequency to produce a beat frequency much lower than that of the input signal.

DESCRIPTION OF THE PREFERRED EMBODIMENT

A typical CW gas laser consists of an active medium capable of amplifying optical signals over some band of frequencies, the width of this band being determined by the atomic system being used and its environment. For the case of an argon gas discharge, for example, the width of this band is approximately 4 gHz. centered around several lines in the visible spectrum. By placing this optically active medium in a Fabry-Perot interferometer, the system can be made to oscilliate at the resonances of the Fabry-Perot cavity which fall within the frequency region of gain. The output will then consist of a set of oscillating modes whose frequencies are separated by $c/2L$, where $c$ is the velocity of light, and L is the optical length between the mirrors of the cavity. For the case of an argon ion laser operating at the 4880 A. line, a spread of approximately 4 gHz. exists between the oscillating modes. In a typical laser geometry where the mode frequency separation is 100 mHz., approximately 40 modes can be made to oscillate. A laser mode structure consisting of the set of oscillating frequencies defined by the Fabry-Perot resonances which fall in the gain profile is shown schematically in FIGURE 2 as the solid line unshifted modes.

Figure 1:
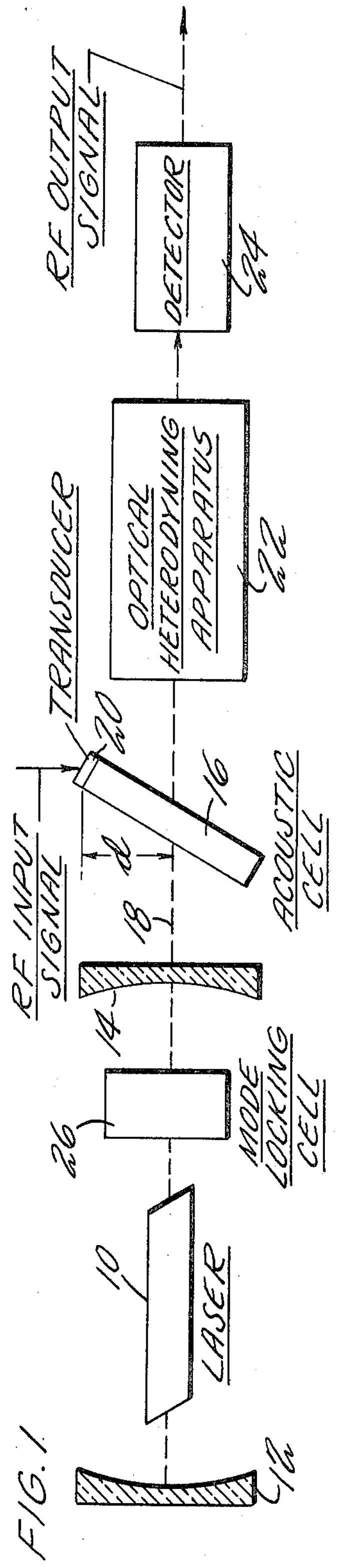
FIGURE 1 shows a schematic block diagram of a mode-locked laser frequency translated acoustic delay line system.

FIGURE 1 shows a typical laser 10 such as the above described argon ion laser in an interferometer cavity comprising 100% reflecting mirror 12 and 95% reflecting mirror 14. In order to form a delay line, an acoustic cell 16 is positioned in the path of the laser beam shown at 18, and a radio frequency input signal from a source (not shown) is fed to a transduced 20 attached to one end of the acoustic cell. An acoustic wave will is thereby set up in the acoustic cell. The acoustic wave will intersect the laser beam at a time dependent upon the distance $d$ between the transducer 20 and the point of intersection of the acoustic wave with the laser beam.

The acoustic cell is positioned at the Bragg angle relative to the laser beam, and for input frequencies above about 200 megacycles, Bragg angle diffraction takes place. A portion of the laser beam is both diffracted and frequency shifted by the acoustic wave when the laser beam interacts with the acoustic wave. The remainder of the laser beam remains as the undiffracted beam.

Figure 2:
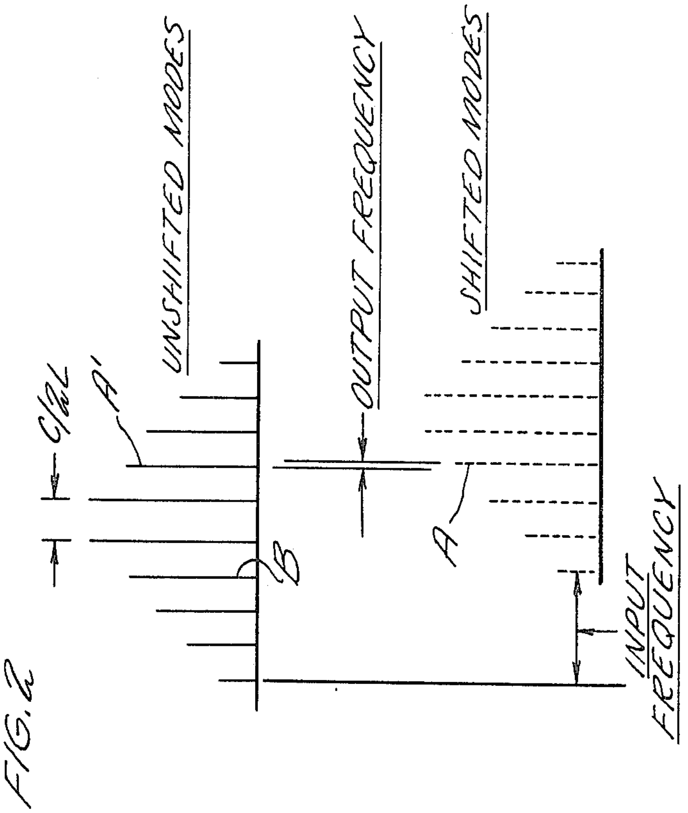
FIGURE 2 shows graphically the shifted and unshifted modes of the laser beam utilized in the system of FIGURE 1.

Since the laser beam is composed of a set of discrete frequencies or modes, the diffracted beam is composed of a corresponding set of modes shifted from the original set by the acoustic frequency, that is, each mode in the diffracted set is shifted from its parent by the same amount as illustrated by the dotted lines in FIGURE 2.

In the normal operation of a laser acoustic delay line, the output signal is obtained by heterodyning the diffracted and undiffracted components and observing the summation of beats between each diffracted mode with its undiffracted parent mode. Since each diffracted mode has the same phase as its undiffracted parent, the output signal of a laser acoustic delay line has the same phase as the input signal.

In FIGURE 1, the optical heterodyning apparatus is shown as block 22. Various methods of producing optical heterodyning are known in the art. The output from the heterodyning apparatus impinges on a detector 24 from which an RF output signal is produced.

Rather than mixing a diffracted mode with its parent as in the prior art, this invention significantly reduces the frequency response requirements of the output photodetector by producing the output signal as a beat between a diffracted mode and any other unshifted mode. Thus, an output can be obtained if the receiver which is used to detect the output of the photodetector or photodiode 24 is tuned not to the frequency of the RF input signal, but to a frequency corresponding to the mixing of a diffracted mode with a neighboring mode in the undiffracted or unshifted set. In FIGURE 2 this is shown by the mixing of the shifted mode A with the unshifted mode $A^1$ to produce a very low output frequency rather than as in the prior art mix the shifted mode A with its unshifted parent B. The number of modes of each set will contribute to the output signal will depend upon the degree of frequency overlap of the two sets of modes.

In a normal operation, where the diffracted modes are heterodyned with their undiffracted parent modes, the heterodyned output signal has the same phase information as the RF input signal since the acoustic diffraction preserves the phase between the diffracted and undiffracted light. This is not true when the laser acoustic delay line is operated in the frequency translated mode where the diffracted mode is beating with other than its parent mode. In order to preserve phase information between the input and output laser acoustic delay line signals with this type of operation, the various oscillating modes of the laser must be locked in frequency and phase. Consequently it is required that the laser be mode-locked as shown by mode-locking cell 26 inserted in the interferometer cavity, that is, between mirrors 12 and 14. Such mode-locking cells are well known in art and may consist of a saturable absorber or dye, an acoustic cell, or a Pockel cell. Once the laser is mode or phase locked, each mode has a definite fixed phase relation to any other mode. Thus the output signal resulting from the heterodyning between a diffracted mode and any other mode will preserve phase coherence between the input RF signal and the output RF signal of the laser acoustic delay line.

For example, in one experiment a receiver tuned to an output signal of 60 mHz. responded to the beat of a diffracted mode shifted 850 mHz. from its parent mode with one of its near neighbors in the undiffracted spectra. The receiver consisted only of a 60 mHz. intermediate frequency amplifier and detector normally used in conjunction with a mixer and local oscillator at higher frequencies.

The most significant aspect of the operation of the laser acoustic delay line in the frequency translated mode of this invention is that the photodetector 24 need only respond to the particular beat frequency desired. As indicated above, for an initial 850 mHz. input signal, the photodetector need only respond at 60 mHz. This capability not only allows operation of the laser acoustic delay line beyond the usable frequency range of a given photodetector, but lowers the output frequency to a range where inexpensive, high-gain photomultipliers can be employed for detectors 24.

There are some applications for laser acoustic delay lines where the phase information between the shifted and unshifted modes is not required. With these applications mode-locking cell 26 need not be included in the system.

Since it is the spacing between the mirrors which determines the laser mode separation frequency, adjustment of the mirrors can be used to place the output at a convenient point in the RF spectrum, for example at the input frequency of an IF strip. In operation, the mode separation frequency $\Delta f$ is adjusted so that the following relation is satisfied between the input frequency $fi$ and the output frequency $fo$;

$$fi - m\Delta f = fo;\ m = 1, 2, 3, \ldots$$

The quantity $m\Delta f$ cannot exceed the bandwidth of the laser. In the argon system it can be as large as 4 gHz., while in a Nd:YAG it can be 25 gHz. or more. As an example of operation, if $fi$ were to be centered at 2.04 gHz., $\Delta f$ would be adjusted to 300 mHz. corresponding to a mirror separation of 50 centimeters. This would allow the output frequency $fo$ to be centered at 60 mHz. and could, for example, be fed directly into a wide band IF and detector strip without any further need of RF heterodyning.

While this invention has been shown and described with the respect to the preferred embodiment, it should be understood by those skilled in the art that the foregoing and various other changes and omissions in the form and detail thereof may be made without departing from the scope of the invention, which is to be limited and defined only as set forth in the following claims.

Having thus described the preferred embodiment of our invention, what we claim as new and desire to secure by Letters Patent of the United States is:

1. A laser-acoustic delay line comprising:
an acoustic cell,
a transducer connected with said acoustic cell for generating an acoustic wave in said cell in response to an input signal,
means for generating a mode-locked laser beam intersecting said acoustic wave whereby an undiffracted component and a diffracted component of said laser beam are produced,
means for heterodyning said diffracted and undiffracted laser beam components to produce a beat frequency signal at a frequency lower than the frequency of said input signal,
and a detector responsive to said beat frequency signal for producing an output signal therefrom, said output signal being equivalent to said input signal through a time delay.

2. A laser-acoustic delay line as in claim 1 in which said laser beam intersects said acoustic wave at the Bragg angle.

3. A laser-acoustic delay line as in claim 1 in which said means to generate a mode-locked laser beam comprises a laser interferometer feedback cavity for producing a laser beam, and a mode-locking cell in the path of said laser beam.

4. A laser-acoustic delay line as in claim 3 in which said laser interferometer feedback cavity consists of a pair of parallel spaced mirrors, and in which said mode-locking cell is positioned between said mirrors.

5. A laser-acoustic delay line as in claim 4 and including means for varying the frequency of said beat frequency signal.

6. A laser-acoustic delay line as in claim 5 in which said means for adjusting the frequency of said beat frequency signal comprises means for varying spacing between said laser interferometer cavity mirrors.

No references cited.

ALFRED L. BRODY, Primary Examiner

DARWIN R. HOSTETTER, Assistant Examiner

U.S. Cl. X.R.

321—69; 331—94.5; 333—30